US012692085B2

(12) United States Patent
Qiu et al.

(10) Patent No.: US 12,692,085 B2
(45) Date of Patent: Jul. 28, 2026

(54) CONVEYING DEVICE

(71) Applicant: Wuxi Lead Intelligent Equipment Co., Ltd., Wuxi (CN)

(72) Inventors: Ronghai Qiu, Wuxi (CN); Wei Lu, Wuxi (CN); Ying Qian, Wuxi (CN); Zan Zong, Wuxi (CN)

(73) Assignee: Wuxi Lead Intelligent Equipment Co., Ltd., Wuxi (CN)

( * ) Notice: Subject to any disclaimer, the term of this patent is extended or adjusted under 35 U.S.C. 154(b) by 84 days.

(21) Appl. No.: 18/578,931

(22) PCT Filed: Apr. 14, 2022

(86) PCT No.: PCT/CN2022/086828
§ 371 (c)(1),
(2) Date: Jan. 12, 2024

(87) PCT Pub. No.: WO2023/284342
PCT Pub. Date: Jan. 19, 2023

(65) Prior Publication Data
US 2024/0140720 A1      May 2, 2024

(30) Foreign Application Priority Data
Jul. 13, 2021    (CN) .......................... 202121590455.5

(51) Int. Cl.
*B65G 23/24* (2006.01)
(52) U.S. Cl.
CPC .................................... *B65G 23/24* (2013.01)
(58) Field of Classification Search
None
See application file for complete search history.

(56) References Cited

U.S. PATENT DOCUMENTS

| | | | | |
|---|---|---|---|---|
| 4,278,165 A | * | 7/1981 | Nielsen ................ | B65G 47/962 |
| | | | | 198/370.04 |
| 6,502,687 B1 | * | 1/2003 | Ayen .................... | B65G 47/962 |
| | | | | 198/370.04 |
| 6,874,614 B2 | * | 4/2005 | Heitplatz ............. | B65G 47/962 |
| | | | | 209/912 |
| 8,727,103 B2 | * | 5/2014 | Vitalini ................ | B65G 47/962 |
| | | | | 198/370.03 |
| 9,481,529 B2 | * | 11/2016 | Berdelle-Hilge .... | B65G 47/962 |

FOREIGN PATENT DOCUMENTS

| | | | |
|---|---|---|---|
| CN | 111561721 A | | 8/2020 |
| CN | 111891733 A | | 11/2020 |
| JP | 58022209 A | * | 2/1983 |
| JP | S5822209 A | | 2/1983 |

* cited by examiner

*Primary Examiner* — Kavel Singh
(74) *Attorney, Agent, or Firm* — Baker Botts LLP

(57) ABSTRACT

The disclosed subject matter includes a conveying device, including a mounting seat, a moving assembly, a bearing platform, a rotating assembly, a driving assembly, and a transmission assembly. The mounting seat is configured to move under drive of the moving assembly. The bearing platform is rotatably provided on the mounting seat under drive of the rotating assembly. The transmission assembly is in transmission connection to the driving assembly, the moving assembly, and the rotating assembly, so that the moving assembly drives the mounting seat and the bearing platform to move, and so that the rotating assembly drives the bearing platform to rotate.

9 Claims, 6 Drawing Sheets

CONVEYING DEVICE

CROSS-REFERENCE TO RELATED APPLICATIONS

The present disclosure is a National Stage of International Application No. PCT/CN2022/086828, filed on Apr. 4, 2022, which claims priority to Chinese Patent Application No. 202121590455.5, filed on Jul. 13, 2021 and entitled "CONVEYING DEVICE", the entireties of which are incorporated herein by reference.

TECHNICAL FIELD

Embodiments of the present disclosure relate to the field of automation equipment, and particularly, to a conveying device.

BACKGROUND

In a production line, a product needs to flipped and/or moved after being carried to a predetermined station by a conveying device, so as to facilitate processing. For example, in a manufacturing process of a battery pack, manual labor is utilized to assemble relevant parts to the battery pack. Due to the large length and width of the battery pack (1.7 m*2.6 m), when it is positioned horizontally, it is inconvenient to manually operate on the central area of the battery pack. It is thus necessary to flip the battery pack by a certain angle, thus facilitating manual operation on the central area of the battery pack.

Currently, the conveying device flips and/or moves the product via different driving devices, resulting in high manufacturing costs.

SUMMARY

In view of the above, the main technical problem to be solved by the present disclosure is to provide a conveying device, which can reduce the manufacturing cost.

To solve the above technical problem, a technical solution adopted in an embodiment of the present disclosure is to provide a conveying device, which comprises a mounting seat, a moving assembly, a bearing platform, a rotating assembly, a driving assembly and a transmission assembly. The mounting seat is movable via the moving assembly and is configured to move under drive of the moving assembly. The bearing platform is rotatably provided on the mounting seat via the rotating assembly and is configured to rotate under drive of the rotating assembly. The transmission assembly is in transmission connection to the driving assembly, the moving assembly and the rotating assembly respectively, so as to transmit driving force of the driving assembly to the moving assembly, such that the moving assembly drives the mounting seat and the bearing platform to move, and transmits the driving force of the driving assembly to the rotating assembly so that the rotating assembly drives the bearing platform to rotate.

Further, the transmission assembly is capable of synchronously transmitting the driving force of the driving assembly to the moving assembly and the rotating assembly, respectively, so that the bearing platform is moved and rotated synchronously; the bearing platform is provided with a bearing surface, and when the bearing platform is being moved toward a side, the bearing platform is rotated until the bearing surface faces the side.

Further, the rotating assembly comprises a first rotating element. The first rotating element is rotatably provided on the mounting seat, and is connected to the bearing platform so as to drive the bearing platform to rotate relative to the mounting seat; wherein, the transmission assembly is in transmission connection to the first rotating element, so as to transmit the driving force of the driving assembly to the first rotating element and thus to drive the first rotating element to rotate.

Further, the transmission assembly comprises a second rotating element. The second rotating element is rotatably provided on the mounting seat, and is in transmission connection to the first rotating element; wherein, the driving assembly is connected to the second rotating element so as to drive the second rotating element to rotate.

Further, the second rotating element and the first rotating element are in gear transmission.

Further, the second rotating element and the first rotating element have axes parallel to each other, and have at least two transmission engagement points which are provided to be spaced apart along an axial direction of the second rotating element.

Further, the moving assembly comprises a base and a movable element. The movable element is slidably fitted to the base and is connected to the mounting seat so as to drive the mounting seat to move relative to the base; wherein, the transmission assembly is provided on the mounting seat and is in transmission connection to the base, so as to transmit the driving force of the driving assembly to the base and thus to drive the movable element to move.

Further, the transmission assembly comprises a second rotating element. The second rotating element is rotatably provided on the mounting seat, and is in transmission connection to the base; wherein the driving assembly is connected to the second rotating element so as to drive the second rotating element to rotate.

Further, the transmission assembly comprises a third rotating element. The third rotating element is rotatably provided on the mounting seat, is in gear transmission with the second rotating element, and is in rack and gear transmission with the base.

Further, the transmission assembly comprises a second rotating element. The second rotating element is rotatably provided on the mounting seat, and is in transmission connection to the moving assembly and the rotating assembly respectively. The driving assembly comprises a motor. The motor is provided on the mounting seat, and an output shaft of the motor is in gear transmission with the second rotating element.

The beneficial effect of the embodiment of the present disclosure is that, unlike the prior art, the transmission assembly in the present disclosure transmits the driving force of the driving assembly to the moving assembly, so that the moving assembly drives the mounting seat and the bearing platform to move, thus enabling a product carried by the bearing platform to move. The transmission assembly also transmits the driving force of the driving assembly to the rotating assembly, so that the rotating assembly drives the bearing platform to rotate, thus enabling a product carried by the bearing platform to rotate. Embodiments of the present disclosure drive the bearing platform to rotate and move with the same driving assembly, thereby reducing the manufacturing cost.

BRIEF DESCRIPTION OF THE DRAWINGS

In order to clearly illustrate technical solutions in embodiments of the present disclosure, accompanying drawings that need to be used in description of the embodiments will be briefly introduced as follows. Obviously, drawings in following description are only some of the embodiments of the present disclosure. For those skilled in the art, other drawings can also be obtained according to the disclosed drawings without creative efforts. In the drawings.

DESCRIPTION OF REFERENCE SIGNS

1—product, 100—conveying device, 200—AGV car, 300—first operating station, 400—second operating station, 10—moving assembly, 11—base, 12—movable element, 20—mounting seat, 21—baseplate, 22—side plate, 30—bearing platform, 31—bearing surface, 50—rotating assembly, 51—first rotating element, 52—bearing, 40—transmission assembly, 41—second rotating element, 42—first gear, 43—second gear, 44—third gear, 45—rack, 46—third rotating element, 47—fourth gear, 48—fifth gear, 49—sixth gear, 60—driving assembly, 61—motor, 62—seventh gear.

DETAILED DESCRIPTION

The technical solutions in the embodiments of the present disclosure will be clearly and completely described below in conjunction with the accompanying drawings in the embodiments of the present disclosure. Obviously, the described embodiments are only a part of the embodiments of the present disclosure, and not all of them. Based on the embodiments in the present disclosure, all other embodiments obtained by a person of ordinary skill in the art without making creative effort shall fall within the scope of protection of the present disclosure.

Figure 1:
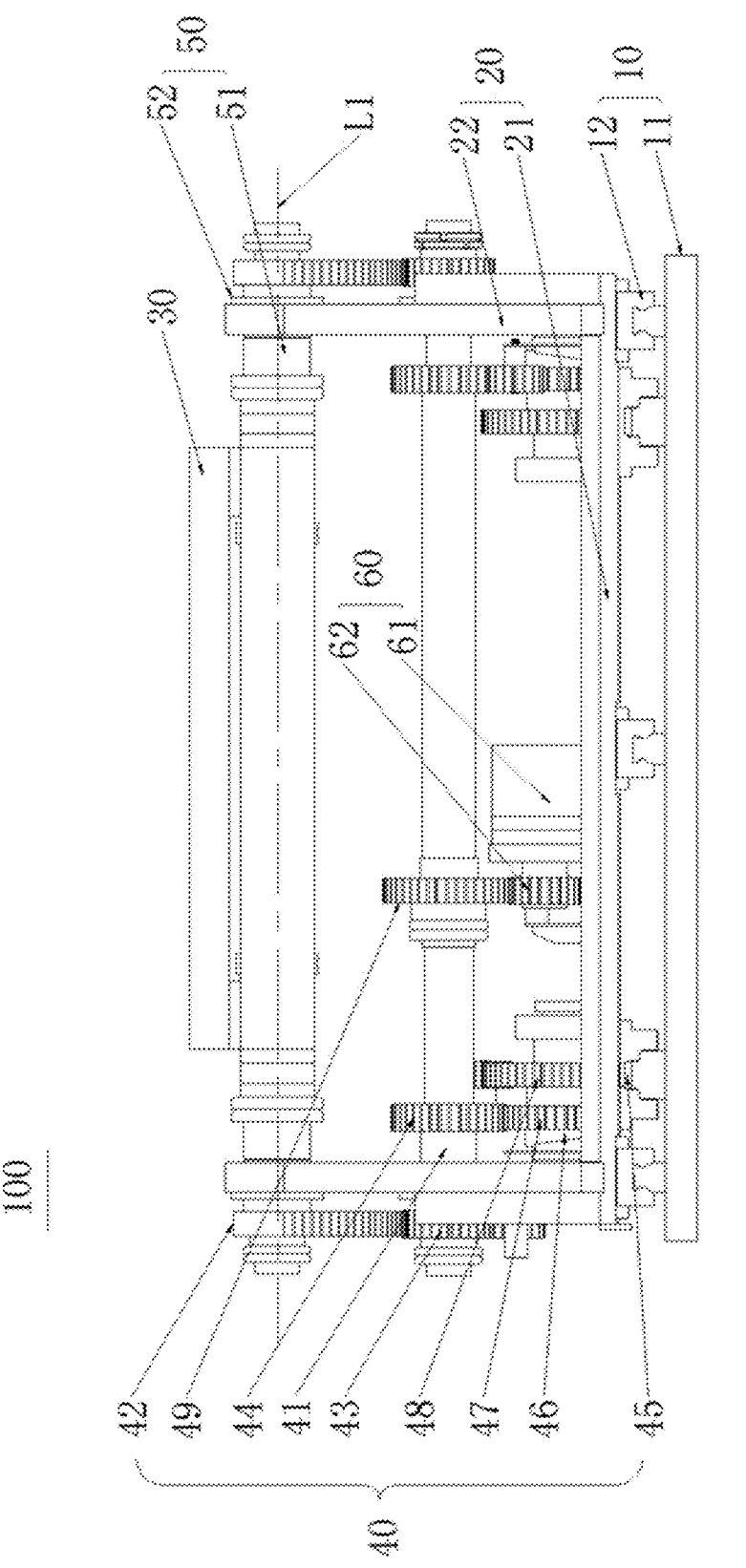
FIG. 1 is a front view of a conveying device according to an embodiment of the present disclosure.
Figure 2:
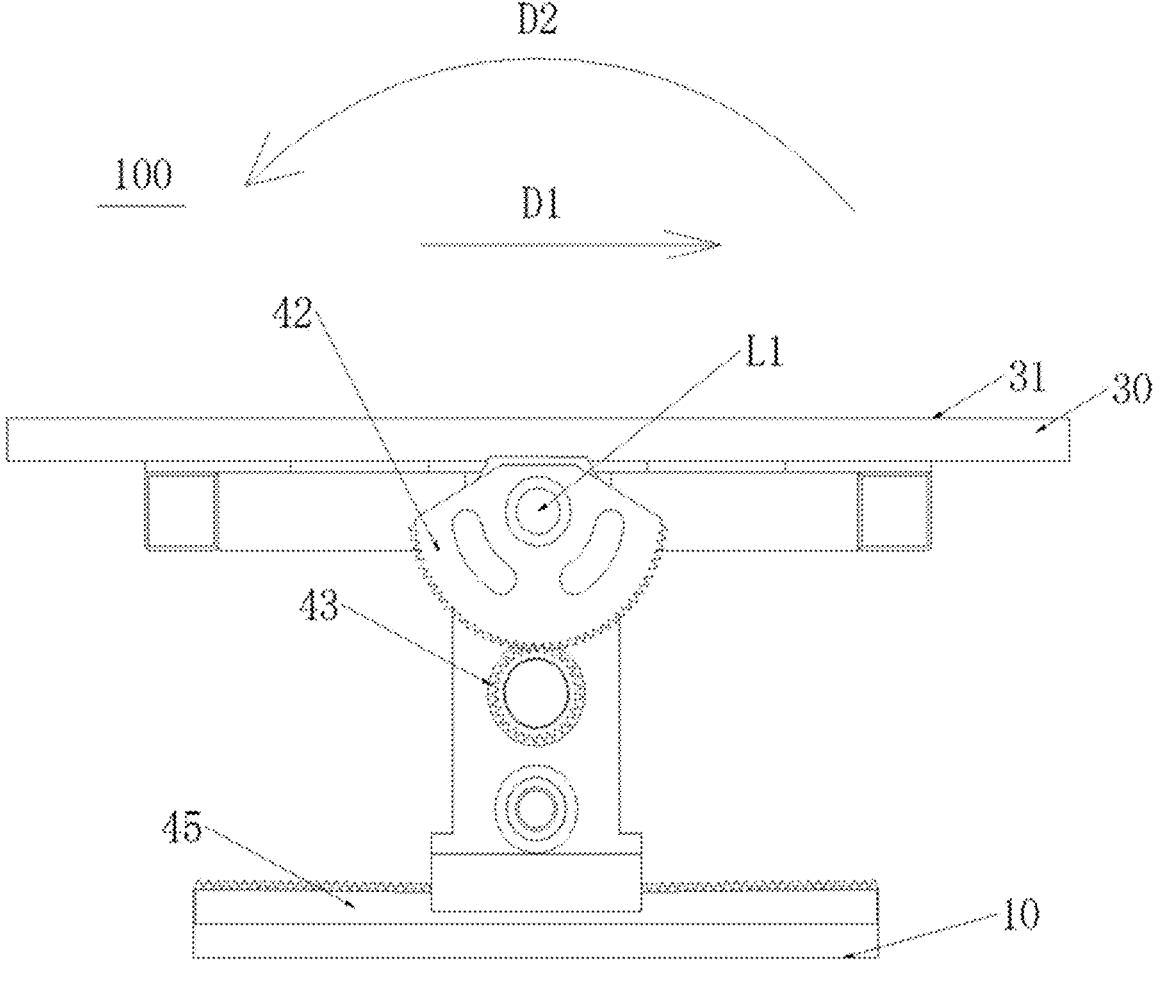
FIG. 2 is a right view of the conveying device shown in FIG. 1.
Figure 3:
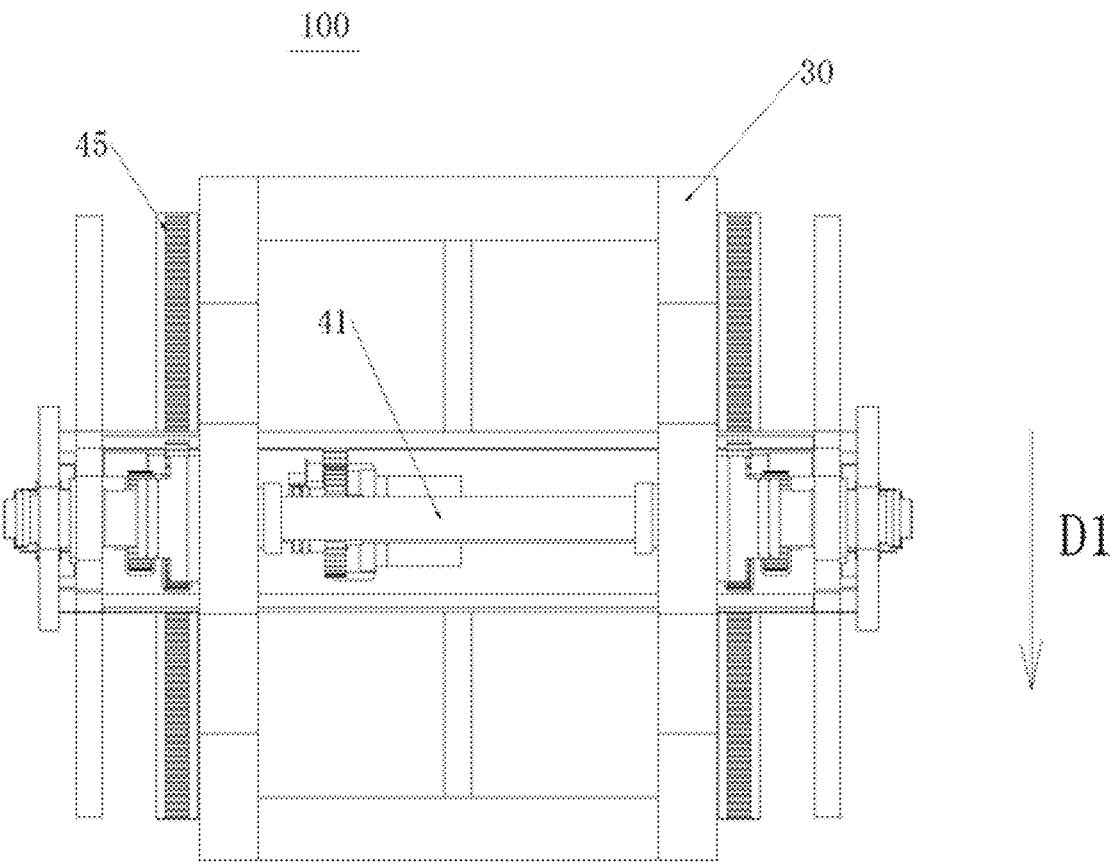
FIG. 3 is a top view of the conveying device shown in FIG. 1.

FIGS. 1 to 3 are respectively a front view, a right view and a top view of a conveying device 100 according to an embodiment of the present disclosure. Some parts are omitted in FIG. 3. As shown in FIGS. 1 to 3, the conveying device 100 comprises a mounting seat 20, a moving assembly 10, a bearing platform 30, a rotating assembly 50, a driving assembly 60 and a transmission assembly 40.

The mounting seat 20 is movable via the moving assembly 10 and is configured to move under drive of the moving assembly 10. Specifically, the mounting seat 20 can reciprocate in the first direction D1. The mounting seat 20 comprises a baseplate 21 and two side plates 22. The two side plates 22 are provided to be spaced apart on the baseplate 21 such that the mounting seat 20 is substantially U-shaped.

The bearing platform 30 is rotatably provided on the mounting seat 20 about the axis L1 via the rotating assembly 50, and is configured to rotate under drive of the rotating assembly 50. Specifically, the bearing platform 30 is located in a space between the two side plates 22, and the two sides of the bearing platform 30 are rotatably connected to the two side plates 22 through the rotating assembly 50. The bearing platform 30 is capable of rotating reciprocally in the second direction D2. The bearing platform 30 is configured for carrying the product 1 (see FIG. 4). Specifically, the product 1 may be placed on the bearing platform 30 by means of a carrier (not shown) to avoid the product 1 falling down when the bearing platform 30 is rotated. The product 1 may be a battery pack.

Both the transmission assembly 40 and the driving assembly 60 are provided on the mounting seat 20. The transmission assembly 40 is in transmission connection to the driving assembly 60, the moving assembly 10 and the rotating assembly 50 respectively, so as to transmit driving force of the driving assembly 60 to the moving assembly 10, such that the moving assembly 10 drives the mounting seat 20 and the bearing platform 30 to move, and transmits the driving force of the driving assembly 60 to the rotating assembly 50 so that the rotating assembly 50 drives the bearing platform 30 to rotate.

In the present embodiment, the transmission assembly 40 is capable of synchronously driving the rotating assembly 50 and the moving assembly 10. Specifically, the transmission assembly 40 is capable of synchronously transmitting the driving force of the driving assembly 60 to the moving assembly 10 and the rotating assembly 50, respectively, so that the bearing platform 30 is moved and rotated synchronously.

The bearing platform 30 is provided with a bearing surface 31. When the bearing platform 30 is being moved toward a side, the bearing platform 30 is rotated until the bearing surface 31 faces the side. Specifically, in FIG. 2, when the bearing platform 30 is moved in the opposite direction of the first direction D1, the bearing platform 30 is rotated in the second direction D2 such that the bearing surface 31 faces toward the left. When the bearing platform 30 moves in the first direction D1, the bearing platform 30 is rotated in the opposite direction of the second direction D2 such that the bearing surface 31 faces toward the right. In an application scenario of the conveying device 100, "a side" mentioned above may be the side of the bearing platform 30 facing an operator. The bearing platform 30 carries the product to move toward the operator and is rotated until the product is facing toward the operator, thereby facilitating the operator's work.

The specific structure of the transmission assembly 40 is described in detail below. In other embodiments, the structure of the transmission assembly 40 may be changed as needed, so that the driving assembly 60 drives the rotating assembly 50 and the moving assembly 10 in separate steps, or alternatively drives both the rotating assembly 50 and the moving assembly 10.

Figure 4:
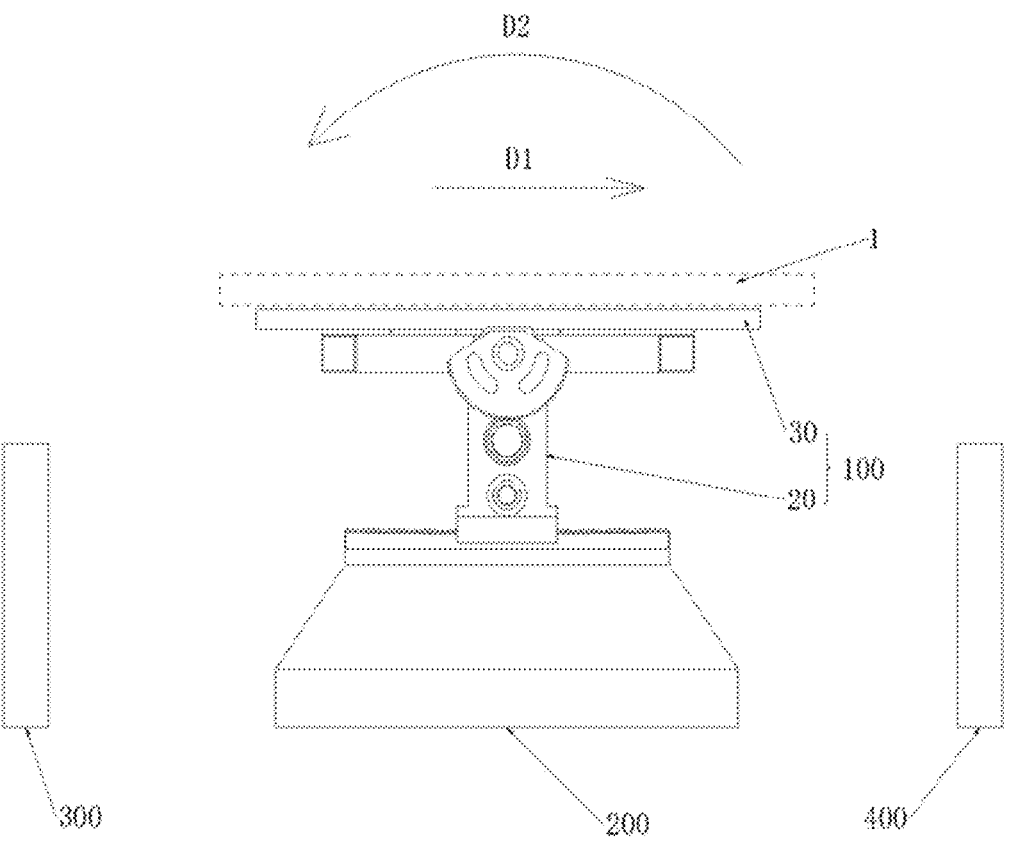
FIG. 4 is a schematic illustration of a conveying device according to an embodiment of the present disclosure being carried by an AGV car to a predetermined position in an application scenario.

FIG. 4 is a schematic illustration of a conveying device 100 according to an embodiment of the present disclosure being carried by an AGV car 200 to a predetermined position in an application scenario. As shown in FIG. 4, the conveying device 100 is provided on the AGV car 200, which travels in a predetermined path and carries the conveying device 100 to the predetermined position. The mounting seat 20 is capable of reciprocating relative to the AGV car 200 in the first direction D1. At the predetermined position, a first operating station 300 and a second operating station 400 are provided to be spaced apart in the first direction D1. The first operating station 300 and the second operating station 400 are each provided with an operator to process the product 1 on the conveying device 100.

Figure 5:
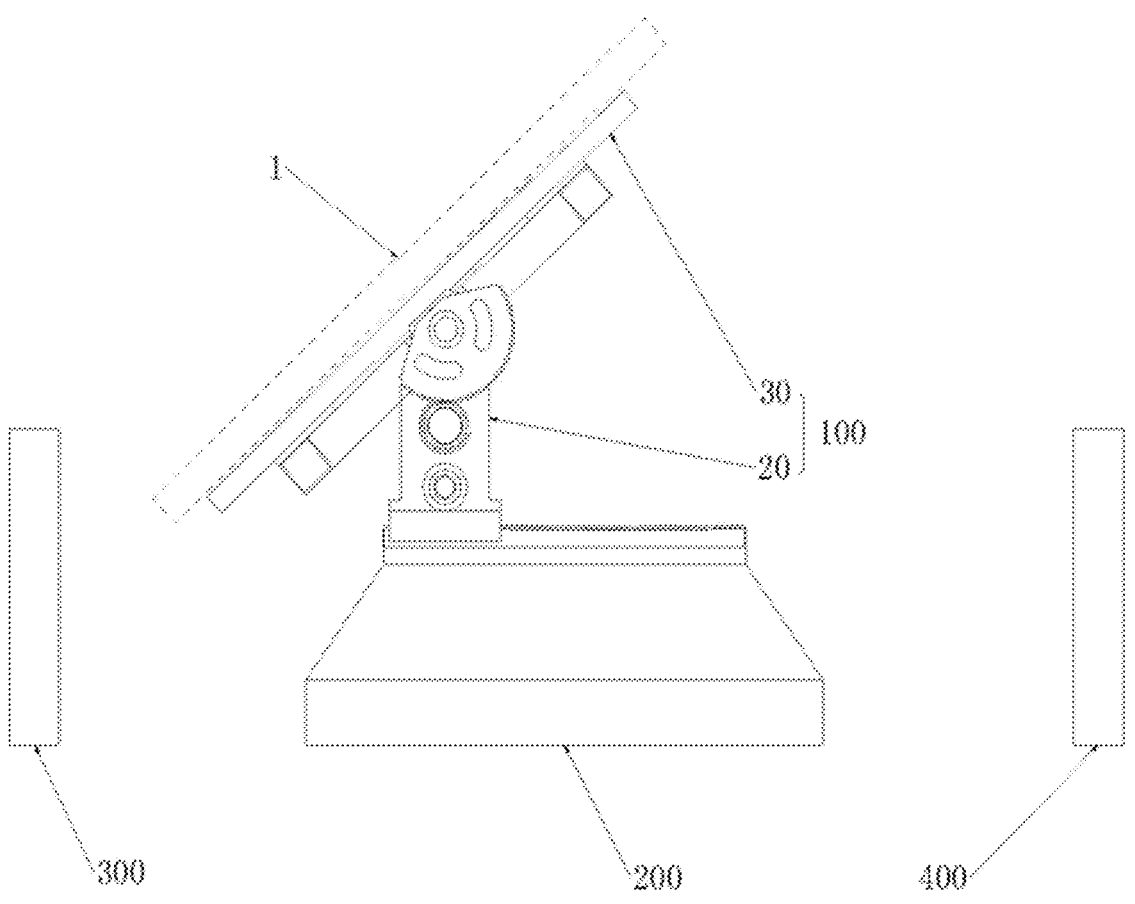
FIG. 5 is a schematic illustration of a conveying device according to an embodiment of the present disclosure in a first predetermined orientation at a predetermined position.
Figure 6:
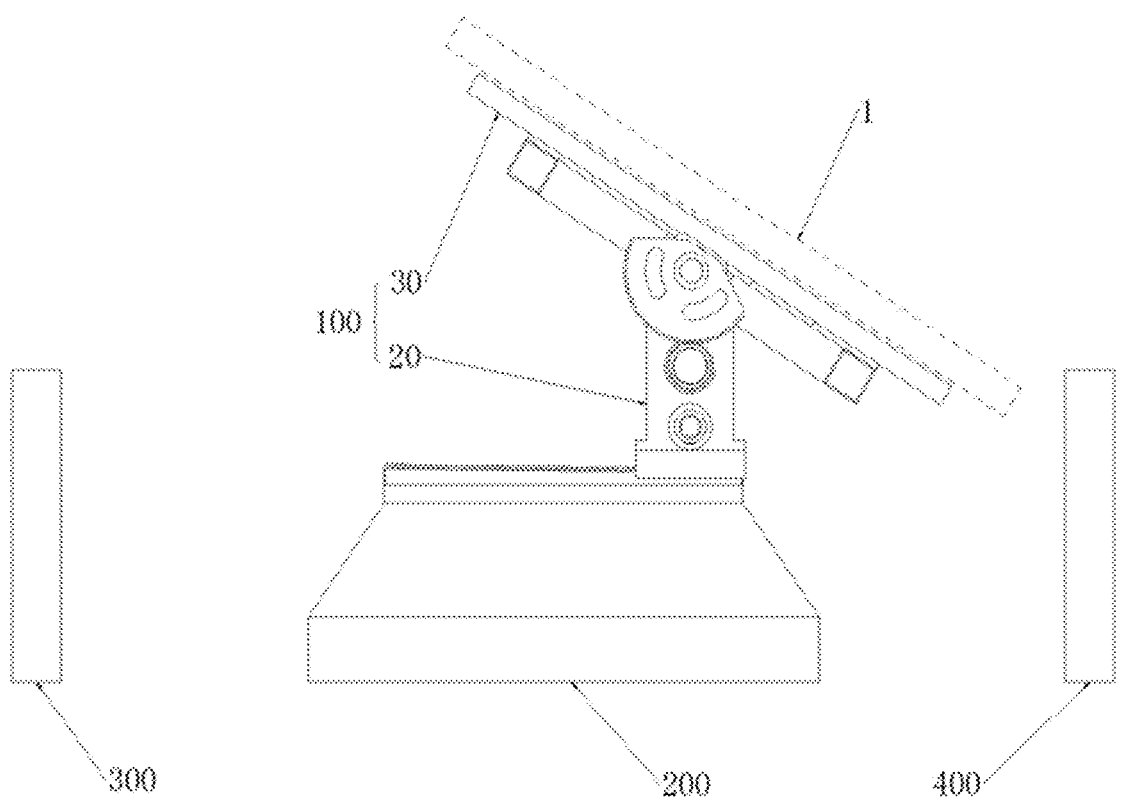
FIG. 6 is a schematic illustration of a conveying device according to an embodiment of the present disclosure in a second predetermined orientation at a predetermined position.

FIGS. 5 and 6 are schematic illustrations of the conveying device 100 according to an embodiment of the present disclosure at the predetermined position in a first predetermined orientation and a second predetermined orientation, respectively. As shown in FIGS. 4 to 6, at the predetermined position, the conveying device 100 operates as follows (at this predetermined position, the AGV car 200 is stationary):

The driving assembly 60 drives the mounting seat 20 to move in a direction opposite to the first direction D1, and the mounting seat 20 drives the bearing platform 30 and the product 1 carried by the bearing platform 30 to move; meanwhile, the bearing platform 30 is rotated in the second direction D2 under drive of the driving assembly 60. When the product 1 moves to the first predetermined orientation, the operator of the first operating station 300 processes the product 1. Here, in the first predetermined orientation, the product 1 is close to the first operating station 300, and a top surface of the product 1 is inclined toward the first operating station 300, so as to facilitate the operation of the operator of the first operating station 300.

After the operator of the first operating station 300 finishes the operation, the driving assembly 60 drives the mounting seat 20 to move in the first direction D1, and the mounting seat 20 drives the bearing platform 30 and the product 1 carried by the bearing platform 30 to move; meanwhile, the bearing platform 30 is rotated in a direction opposite to the second direction under drive of the driving assembly 60. When the product 1 is moved to the second predetermined orientation, the operator of the second operating station 400 processes the product 1. Here, in the second predetermined orientation, the product 1 is close to the second operating station 400, and the top surface of the product 1 is inclined toward the second operating station 400, so as to facilitate the operation of the operator of the second operating station 400.

In the conveying device 100 of this embodiment, the transmission assembly 40 transmits the driving force of the driving assembly 60 to the moving assembly 10, such that the mounting seat 20 and the bearing platform 30 are moved under drive of the moving assembly 10, thus enabling the product 1 carried by the bearing platform 30 to move. Further, the transmission assembly 40 transmits the driving force of the driving assembly 60 to the rotating assembly 50, such that the bearing platform 30 is rotated under drive of the rotating assembly 50, thus enabling the product 1 carried by the bearing platform 30 to rotate. The present embodiment drives the bearing platform 30 to rotate and move with the same driving assembly 60, thereby reducing the manufacturing cost.

In addition, the conveying device 100 is not only capable of driving the bearing platform 30 to rotate, but also capable of driving the bearing platform 30 to translate, while the height of the rotation center (axis L1) of the bearing platform 30 does not change, which facilitates the operation of the operator on the product 1 on the bearing platform 30.

As shown in FIGS. 1 to 3, in some embodiments, the rotating assembly 50 may comprise a first rotating element 51 and two bearings 52. The first rotating element 51 is a rotating shaft. Its two ends are rotatably provided on the mounting seat 20 (two side plates 22) via the two bearings 52, respectively. The first rotating element 51 rotates about the axis L1. The first rotating element 51 is connected to the bearing platform 30 to drive the bearing platform 30 to rotate relative to the mounting seat 20. The first rotating element 51 and the bearing platform 30 may be of a separate structure or an integrated structure. Here, the transmission assembly 40 is in transmission connection with the first rotating element 51 to transmit the driving force of the driving assembly 60 to the first rotating element 51, thereby driving the first rotating element 51 to rotate.

In the embodiment that the rotating assembly 50 includes the first rotating element 51, the transmission assembly 40 may include a second rotating element 41 which is a rotating shaft. The second rotating element 41 is rotatably provided on the mounting seat 20, and is in transmission connection to the first rotating element 51. Here, the driving assembly 60 is connected to the second rotating element 41 so as to drive the second rotating element 41 to rotate. Under drive of the driving assembly 60, the second rotating element 41 causes the first rotating element 51 to rotate, and the latter causes the bearing platform 30 to rotate. In this way, the bearing platform 30 is driven to rotate by the driving assembly 60.

In an application scenario, the product 1 is heavy and the first rotating element 51 needs to generate a large torque so as to drive the product 1 to rotate. For this reason, the rotational angular velocity of the second rotating element 41 is greater than that of the first rotating element 51. That is, the transmission ratio of the second rotating element 41 to the first rotating element 51 is greater than 1. Thus, it is possible to reduce the specification requirement for the driving force of the driving assembly 60.

The transmission connection between the second rotating element 41 and the first rotating element 51 may be gear transmission. Specifically, a first gear 42 is coaxially provided on the first rotating element 51. A second gear 43 is coaxially provided on the second rotating element 41. The first gear 42 and the second gear 43 are meshed with each other. The gear transmission has high transmission precision. In addition, the number of teeth and the diameter of the first gear 42 and/or the second gear 43 may be changed so that when the product 1 is rotated to a predetermined angle, the product 1 is just moved into position. In other embodiments, the transmission connection between the second rotating element 41 and the first rotating element 51 may be a belt transmission, a chain transmission, or the like.

The second rotating element 41 and the first rotating element 51 have axes parallel to each other, and have at least two transmission meshing points which are provided to be spaced apart along an axial direction of the second rotating element 41. Specifically, there are at least two first gears 42, and the two first gears 42 are provided to be spaced apart along the axial direction of the first rotating element 51. The second gear 43 and the first gear 42 are of the same quantity and are in one-to-one correspondence. Each second gear 43 meshes with a corresponding first gear 42. In the present embodiment, there are two first gears 42. The two first gears 42 are located at two ends of the first rotating element 51, and are located on opposite sides of the two side plates 22, respectively. There are also two second gears 43. The two second gears 43 are located at two ends of the second rotating element 41, and are located on opposite sides of the two side plates 22, respectively. Thus, the second rotating element 41 and the first rotating element 51 enable a smooth transmission.

As shown in FIGS. 1 to 3, in some embodiments, the moving assembly 10 may comprise a base 11 and a movable element 12. The base 11 may be fixedly provided on the AGV car 200. The base 11 may also be part of the AGV car 200. The movable element 12 is slidably fitted to the base 11.

A guide rail (not shown) extending in the first direction D1 may be provided on the base 11. The movable element 12 is clamped on the guide rail and is slidably fitted to the guide rail. The movable element 12 is connected to the mounting seat 20 so as to drive the mounting seat 20 to move relative to the base 11. The movable element 12 may be part of the mounting seat 20. Here, the transmission assembly 40 is provided on the mounting seat 20 and is in transmission connection to the base 11, so as to transmit the driving force of the driving assembly 60 to the base 11 and thus to drive the movable element 12 to rotate. The transmission assembly 40 transmits the driving force to the base 11, so that an action force is generated between the mounting seat 20 and the base 11 and thus the mounting seat 20 and the base 11 are moved relative to each other. In other embodiments, the moving assembly 10 may also be a roller rotatably provided on the mounting seat 20. The roller rolls on a reference (such as the AGV car 200). The transmission assembly 40 transmits the driving force to the roller, so that the roller is rotated to drive the mounting seat 20 to move relative to the reference.

In the embodiment that the moving assembly 10 comprises a base 11 and a movable element 12, the transmission assembly 40 may comprise a second rotating element 41 which is a rotating shaft. The second rotating element 41 is rotatably provided on the mounting seat 20, and is in transmission connection to the base 11. Here, the driving assembly 60 is connected to the second rotating element 41 so as to drive the second rotating element 41 to rotate. Under drive of the driving assembly 60, the second rotating element 41 is rotated and transmits the driving force to the base 11, such that the mounting seat 20 drives the bearing platform 30 to move relative to the base 11. In this way, the bearing platform 30 is driven to move by the driving assembly 60.

Further, the transmission assembly 40 comprises a third rotating element 46. The third rotating element 46 is rotatably provided on the mounting seat 20, is in gear transmission with the second rotating element 41, and is in rack and gear transmission with the base 11. Specifically, the second rotating element 41 and the third rotating element 46 are provided in parallel. A third gear 44 is coaxially provided on the second rotating element 41. A fourth gear 47 and a fifth gear 48 are coaxially provided on the third rotating element 46. A rack 45 is fixedly provided on the base 11. The rack 45 extends in the first direction D1. The fourth gear 47 and the third gear 44 are meshed with each other. The fifth gear 48 and the rack 45 are meshed with each other. When the second rotating element 41 rotates, the third rotating element 46 is driven to rotate by the third gear 44 and the fourth gear 47. When the third rotating element 46 rotates, the rotational motion of the third rotating element 46 is converted into a linear motion of the mounting seat 20 by the fifth gear 48 and the rack 45, so that the mounting seat 20 is moved relative to the base 11. Here, the fourth gear 47 and the third gear 44 are meshed with the same outer diameter. The outer diameter of the fifth gear 48 is larger than that of the fourth gear 47. Therefore, the fifth gear 48 generates more torque than the third gear 44, thereby reducing the specification requirements on the driving assembly 60.

In addition, there are at least two third gears 44 (there are two in Figures). The at least two third gears 44 are provided to be spaced apart along the axial direction of the second rotating element 41. The third rotating element 46 and the third gear 44 are of the same quantity and are in one-to-one correspondence. Each third rotating element 46 is provided with a fourth gear 47 and a fifth gear 48. The rack 45 and the third gear 44 are of the same quantity and are in one-to-one correspondence. Each fourth gear 47 is meshed with a corresponding third gear 44. Each rack 45 is meshed with a corresponding fifth gear 48. Therefore, the driving assembly 60 may smoothly drive the mounting seat 20 to move relative to the base 11.

As shown in FIGS. 1 to 3, in some embodiments, the transmission assembly 40 is in transmission connection to the driving assembly 60 as follows: the transmission assembly 40 may include a second rotating element 41 and a sixth gear 49. The second rotating element 41 is rotatably provided on the mounting seat 20, and is in transmission connection to the moving assembly 10 and the rotating assembly 50 respectively. A sixth gear 49 is coaxially provided on the second rotating element 41. The driving assembly 60 comprises a motor 61 and a seventh gear 62. The motor 61 is provided on the mounting seat 20. The output shaft of the motor 61 is provided parallel to the axis of the second rotating element 41. The seventh gear 62 is coaxially provided on the output shaft of the motor 61 and is meshed with the sixth gear 49. The output shaft of the motor 61 is in gear transmission with the second rotating element 41, so that the motor 61 can drive the second rotating element 41 to rotate. In addition, by changing the gear ratio between the output shaft of the motor 61 and the second rotating element 41, it is possible to change the torque on the second rotating element 41. In addition, the structure facilitates the selection of the mounting position of the motor 61, enabling a compact conveying device 100. In other embodiments, the output shaft of the motor 61 may also be coupled to the second rotating element 41 via a coupling. In this case, however, the conveying device 100 occupies a large space.

The foregoing are only embodiments of the present disclosure, and are not intended to limit the scope of the present disclosure. Any conversion to an equivalent structure or equivalent process utilizing the specification and accompanying drawings of the present disclosure, or any direct or indirect application in other related technical fields, shall be similarly included in the scope of protection of the present disclosure.

The invention claimed is:

1. A conveying device, comprising:
   a mounting seat and a moving assembly, wherein the mounting seat is configured to move under drive of the moving assembly along a first direction, and the moving assembly comprises a base;
   a bearing platform having an axis and a rotating assembly, wherein the bearing platform is rotatably provided on the mounting seat via the rotating assembly and is configured to rotate about the axis of the bearing platform under drive of the rotating assembly along a second direction, wherein the axis is perpendicular to the first direction, and the second direction is perpendicular to the first direction;
   a driving assembly; and
   a transmission assembly in transmission connection to the driving assembly, the moving assembly, and the rotating assembly respectively, configured to transmit driving force of the driving assembly to the moving assembly, such that the moving assembly is configured to drive the mounting seat and the bearing platform to move, and transmit the driving force of the driving assembly to the rotating assembly for the rotating assembly driving the bearing platform to rotate, wherein the transmission assembly comprises a second rotating element and a third rotating element which are rotatably provided on the mounting seat, wherein the rotating assembly comprises a first rotating element which is rotatably provided on the mounting seat and connected to the bearing platform to drive the bearing platform to rotate relative to the mounting seat, a first gear is coaxially provided on the first rotating element, a second gear is coaxially provided on the second rotating element, and the first gear and the second gear are meshed with each other, wherein a third gear is coaxially provided on the second rotating element, the third rotating element is in a gear transmission with the second rotating element, a rack extending in the first direction is fixedly provided on the base, and the third rotating element is in a rack and gear transmission with the base, and wherein the transmission assembly is adapted to synchronously transmit the driving force of the driving assembly to the moving assembly and the rotating assembly, respectively, via the third rotating element and the second rotating element, so that the bearing platform is configured to be moved and rotated synchronously.

2. The conveying device of claim 1, wherein the transmission assembly is in transmission connection to the first rotating element, to transmit the driving force of the driving assembly to the first rotating element and thus to drive the first rotating element to rotate.

3. The conveying device of claim 2, wherein the driving assembly is connected to the second rotating element to drive the second rotating element to rotate.

4. The conveying device of claim 2, wherein the second rotating element and the first rotating element have axes parallel to each other, and have at least two transmission engagement points which are provided to be spaced apart along an axial direction of the second rotating element.

5. The conveying device of claim 1, wherein the moving assembly comprises:

a movable element which is slidably fitted to the base and is connected to the mounting seat so as to drive the mounting seat to move relative to the base;

wherein the transmission assembly is provided on the mounting seat and is in a transmission connection to the base, to transmit the driving force of the driving assembly to the base and thus to drive the movable element to move.

6. The conveying device of claim 5, wherein the driving assembly is connected to the second rotating element to drive the second rotating element to rotate.

7. The conveying device of claim 1, wherein the driving assembly comprises: a motor provided on the mounting seat, and an output shaft of the motor is in a gear transmission with the second rotating element.

8. The conveying device of claim 1, wherein the mounting seat comprises a baseplate and two side plates, and the two side plates are provided to be spaced apart on the baseplate, and wherein the bearing platform is located in a space between the two side plates, and two sides of the bearing platform are rotatably connected to the two side plates of the mounting seat through the rotating assembly.

9. The conveying device of claim 1, wherein the bearing platform is provided with a bearing surface, and configured such that when the bearing platform is being moved toward a side, the bearing platform is rotated until the bearing surface faces the side.

* * * * *